US010745872B2

(12) United States Patent
Dalton

(10) Patent No.: US 10,745,872 B2
(45) Date of Patent: Aug. 18, 2020

(54) SIGN WITH PLANTER BASE

(71) Applicant: SignsDirect Inc., Bloomington, IL (US)

(72) Inventor: Thomas Dalton, Heyworth, IL (US)

(73) Assignee: SignsDirect Inc., Bloomington, IL (US)

( * ) Notice: Subject to any disclaimer, the term of this patent is extended or adjusted under 35 U.S.C. 154(b) by 0 days.

(21) Appl. No.: 16/386,869

(22) Filed: Apr. 17, 2019

(65) Prior Publication Data

US 2019/0323186 A1 Oct. 24, 2019

Related U.S. Application Data

(60) Provisional application No. 62/659,219, filed on Apr. 18, 2018.

(51) Int. Cl.
| | | |
|---|---|---|
| *E01F 9/60* | (2016.01) | |
| *E01F 9/692* | (2016.01) | |
| *A01G 9/02* | (2018.01) | |
| *E01F 9/673* | (2016.01) | |

(52) U.S. Cl.
CPC ............... *E01F 9/692* (2016.02); *A01G 9/02* (2013.01); *E01F 9/673* (2016.02)

(58) Field of Classification Search
CPC .. E01F 9/692; E01F 9/673; A01G 9/02; G09F 15/0037; G09F 15/0056; G09F 15/00; G09F 2023/0025
See application file for complete search history.

(56) References Cited

U.S. PATENT DOCUMENTS

| 884,924 | A | * | 4/1908 | Helmschmied | .......... A01G 9/02 |
| | | | | | 47/66.6 |
| 5,052,148 | A | * | 10/1991 | Sharon | ................... A47G 7/047 |
| | | | | | 248/328 |
| 8,887,423 | B1 | * | 11/2014 | Morgan | ................. G08B 5/006 |
| | | | | | 116/63 P |
| 2003/0235054 | A1 | * | 12/2003 | Ruggles | .................... A01G 9/02 |
| | | | | | 362/431 |
| 2004/0216376 | A1 | * | 11/2004 | Missry | ..................... A01G 9/02 |
| | | | | | 47/66.6 |
| 2009/0288607 | A1 | * | 11/2009 | Held | .................. A01K 39/0113 |
| | | | | | 119/52.1 |
| 2012/0047801 | A1 | * | 3/2012 | Hogan | ................... A01G 9/022 |
| | | | | | 47/66.6 |
| 2017/0130481 | A1 | * | 5/2017 | Pozybill | ............. E04H 12/2269 |

FOREIGN PATENT DOCUMENTS

FR 3062985 A1 * 8/2018 ............... A01C 1/04

OTHER PUBLICATIONS idealshield.com—"Sign Base | Pyramid," visited Apr. 16, 2019 at <https://www.idealshield.com/products/sign-base-sign-systems/sign-base-pyramid/>.
plasticade.com—"Rock-It Sign Stands," visited Apr. 16, 2019 at <http://www.plasticade.com/sign_frames/rock-it_sign_stands>.
magicmaster.com—"Portable Pole," visited Apr. 16, 2019 at <https://magicmaster.com/product-category/sidewalk-sign-types/portable-pole/>.

* cited by examiner

*Primary Examiner* — Cassandra Davis
(74) *Attorney, Agent, or Firm* — Banner & Witcoff, Ltd.

(57) ABSTRACT

Sign apparatuses are disclosed, configured with a base, a display panel, and a support post. The base of the sign apparatus may include a planter portion containing display elements such as plant material, where the plant material comprises at least a portion of the ballast weight necessary to stabilize the sign apparatus against the wind and other forces. The base may also include a ballast area for holding additional ballast material.

16 Claims, 5 Drawing Sheets

SIGN WITH PLANTER BASE

CROSS-REFERENCE TO RELATED APPLICATION

This application claims priority to U.S. Provisional Patent Application No. 62/659,219 filed on Apr. 18, 2018. The above referenced application is incorporated by reference in its entirety.

TECHNICAL FIELD

Aspects of the disclosure relate to apparatuses for signs, in particular stationary signs.

BACKGROUND

Conventional wind-resistant signs often rely on the overall weight of the sign to resist the force of the wind. The signs rely on a weighted base to hold the sign in place. The weight may consist of a concrete or sand type mixture that is contained within the base as the weighting material. However, the size of the base to hold a large sign can detract from the sign's overall aesthetic appeal, which can affect the appeal of a storefront or business at the sign's location.

SUMMARY

This Summary introduces some general concepts relating to this disclosure in a simplified form that are further described below in the Detailed Description. This Summary is not intended to identify key features or essential features of the disclosure.

In some examples, the sign apparatus may be stable in response to wind or other forces. In addition, the sign apparatus may have a decorative and aesthetic appeal while resisting the wind and other forces. In particular, certain examples relate to a sign apparatus that comprises a panel displaying visual information attached to a support, the support being attached to a base. The base may include living plant material, such as a plant, multiple plants, or flowers. The base may have a receptacle to contain the plants and any soil to provide a decorative arrangement to the sign apparatus while also providing at least a portion of the weight to provide the necessary ballast to provide stability for the sign apparatus.

This disclosure may relate to a sign apparatus comprising a base having a bottom surface, an upper surface opposite the bottom surface, a receiver that is centrally located on the base and extends through the upper surface and the bottom surface, a receptacle spaced below the upper surface, and a ballast area defined by a hollow lower interior portion of the base positioned below the receptacle, where the receptacle is configured to contain living plant material. The receiver may be configured to receive a support post. The sign apparatus may also comprise a support post received within the receiver, and a panel displaying visual information attached to the support post. The sign apparatus may have an overall height defined as a vertical distance from a bottom surface of the receptacle to an uppermost edge of the panel, where the overall height is between 4 feet and 8 feet. The receptacle may include a shelf spaced away from and below the upper surface, a sidewall and a bottom wall that forms a container configured to hold the living plant material. The receiver may extend through the bottom wall of the receptacle. The sign apparatus may also include a cover that is removably connected to the base, wherein the cover extends from a top of the shelf to the receiver, where the cover has a convexly curved upper surface. The receptacle has at least one opening that allows water to drain from the receptacle into the ballast area, and may be integrally formed with the base. The ballast area may contain a ballast material comprising both solid and liquid components.

Additional aspects of this disclosure may relate to a sign apparatus comprising a base having a bottom surface, an upper surface opposite the bottom surface, a receiver that extends through the upper surface and the bottom surface, a receptacle, and a ballast area positioned below the receptacle, where the receptacle includes a shelf spaced away from and below the upper surface, a sidewall and a bottom wall that forms a container configured to hold display elements. The sign apparatus may further include a support post received within the receiver, and a panel displaying visual information attached to the support post. The sign apparatus may have an overall height defined as a vertical distance from the bottom surface of the base to an uppermost edge of the panel, where the overall height is between 4 feet and 8 feet. The ballast area may contain ballast material such that a combined weight of the ballast material and the display elements comprise at least 50 percent of a total weight of the sign apparatus. The base may have an outer wall extending between the shelf of the receptacle and the bottom surface. The ballast area may have a drain tube that connects to an opening in the outer wall of the base. Additionally, the sign apparatus may have a cover removably connected to the base, wherein the cover extends from a top of the shelf to the receiver. The height of the shelf of the receptacle may be defined as a vertical distance from the bottom surface to a top surface of the shelf, where the height of the shelf is at least two-thirds of a height of the base, where the height of the base is defined as a vertical distance from the bottom surface to upper surface of the base. The base may also include an access panel to access the ballast area. Lastly, the panel may have a vertical height within a range of 16 inches and 20 inches.

In still other aspects of this disclosure may relate to a sign apparatus comprising a base having a bottom surface, an upper surface opposite the bottom surface, a shelf spaced below the upper surface, an outer wall extending between the shelf and the bottom surface, a receiver, where the upper surface forms a top surface of the receiver, and a hollow portion configured to be filled with plant material. A panel displaying visual information may be attached to a support post, where the support post is received in the receiver. The sign apparatus may have an overall height defined as a vertical distance from the bottom surface of the base to an uppermost edge of the panel, where the overall height is between 4 feet and 8 feet. The sign apparatus may also include a cover removably connected to the base, wherein the cover extends from a top surface of the shelf to the receiver.

BRIEF DESCRIPTION OF THE DRAWINGS

Example embodiments of the disclosure will now be described by way of example only and with reference to the accompanying drawings, in which.

DETAILED DESCRIPTION OF EMBODIMENTS

In the following description of various examples of apparatuses, displays, signs, portable signs, and components thereof, of this disclosure, reference is made to the accompanying drawings, which form a part hereof, and in which are shown by way of illustration various example structures and environments in which aspects of the disclosure may be practiced.

It is to be understood that other structures and environments may be utilized and that structural and functional modifications may be made from the specifically described structures without departing from the scope of the present disclosure. Moreover, the figures of this disclosure may represent the scale and/or dimensions according to one or more embodiments, and as such contribute to the teaching of such dimensional scaling. However, those skilled in the art will readily appreciate that the disclosure herein is not limited to the scales, dimensions, proportions, and/or orientations shown in the figures.

The embodiments described herein provide, inter alia, apparatuses for signs, portable signs or other advertising objects. In certain embodiments, the apparatus provides a portable sign including a surface or panel displaying textual and/or visual information. In various other examples, the apparatus may be used to display and/or keep erect other kinds of objects, including, but not limited to models, figures, statutes, and the like. These and other aspects, features and advantages of the disclosure or of certain embodiments of the disclosure will be further understood by those skilled in the art from the following description of example embodiments.

Figure 1:
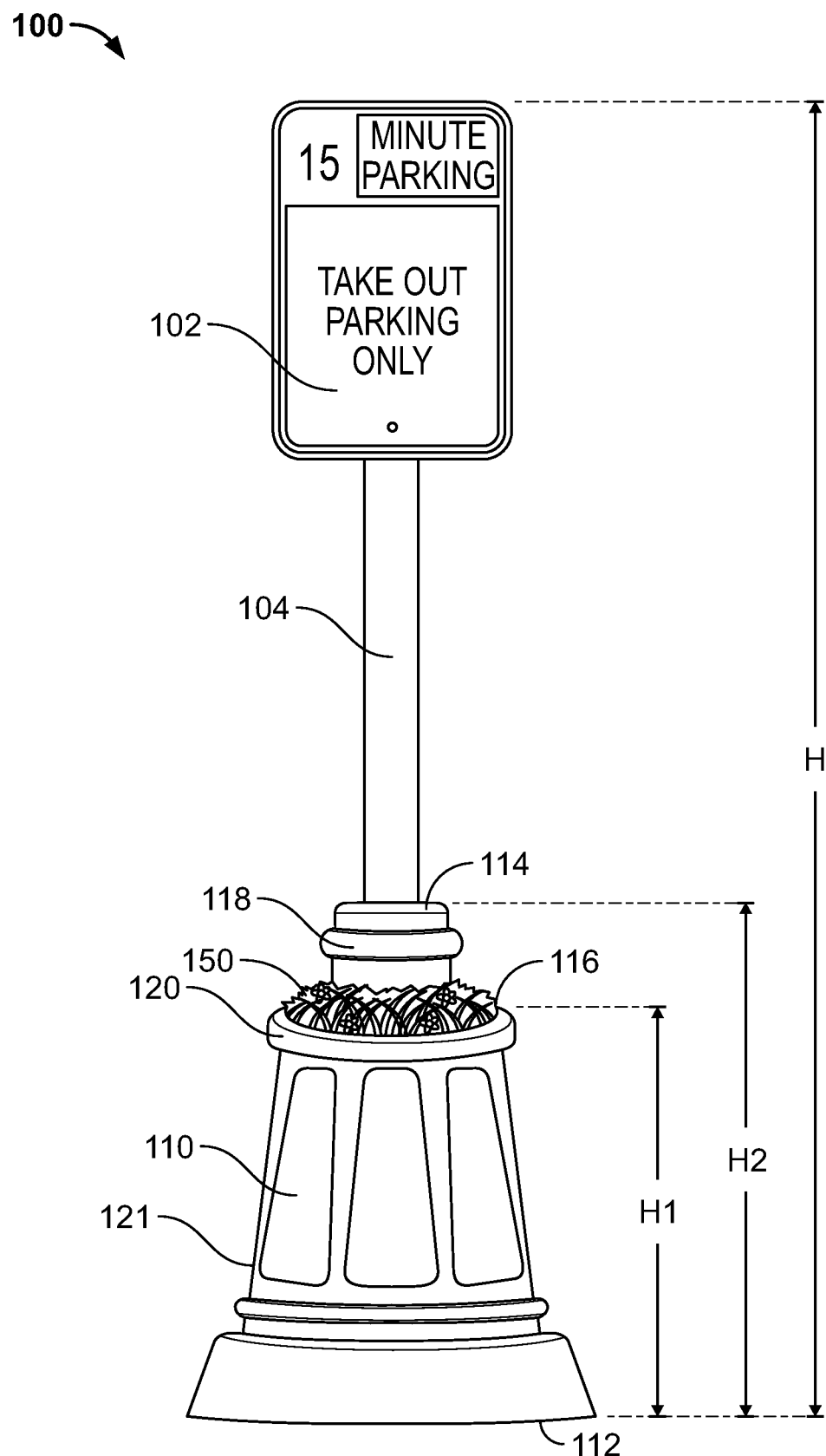
FIG. 1 illustrates a front view of an example embodiment of a sign apparatus as disclosed herein.

In some examples, the sign apparatus 100 may comprise a panel 102, a support post 104, a base 110, and display elements 150, which in the exemplary embodiment contains living plants and/or flowers. FIG. 1 shows a front view of an example embodiment of sign apparatus 100. In the example embodiment, the sign apparatus 100 comprises a panel 102, a support post 104, and a base 110, where the support post 104 secures the panel 102 to the base 110. The base 110 may have a receptacle or planter portion 116, a receiver element 118, and a ballast area 138. The base 110 may also include a bottom surface 112 to engage the ground surface or other surface in which the sign apparatus 100 is placed. In addition, the base 110 may have an upper surface 114 opposite the bottom surface 112. The receiver element 118 may extend from the upper surface 114 located at the top of the receiver element 118 to the bottom surface 112 of the base 110. The receiver element 118 may receive and secure the support post 104 to the base 110. The base 110 may further include a receptacle or planter portion 116 spaced a predetermined distance below the upper surface 114.

The receptacle 116 may be configured to receive a variety of display elements 150 such as living plants including the soil required to allow the plants to thrive, or other growth mediums such as sand, rocks/pebbles, rock wool, clay, chips, mulch, fines, or a combination thereof. In some examples, the receptacle 116 may include one or more components of a water delivery system, such as hydroponics tubing. In certain examples, a control mechanism, water reservoir, and a pump for hydroponics may be stored or incorporated into the receptacle or the ballast area (and in some examples, a water reservoir may act as part or all of the additional ballast material). In still other examples, one or more fountain or running water elements may be used, via the same or a similar system, to act as one or more decorative display elements 150. Any variety of appropriately sized plants may be used. In other examples, different display elements 150 are used instead of, or in conjunction with, one or more plants.

The base 110 may include a hollow portion that may comprise a ballast area 138 arranged at the lower portion of the base 110. The ballast area 138 may contain a ballast material to add mass to the base 110 to assist in providing weight to the base 110 in order to resist any movement caused by wind or other forces. The base 110 may also have an outer wall 121 extending from the shelf 120 of the receptacle 116 and extending to perimeter edges of the bottom surface 112, where the shelf 120 may be the upper surface of the receptacle 116. The outer wall 121 may have a smooth appearance or optionally have a more decorative appearance with scallops and other decorative features. The bottom surface 112 may have a larger area than the area of the upper surface 114, or in some embodiments, the perimeter or circumference of the bottom surface 112 may be larger than the perimeter or circumference of the upper surface 114. Still in other embodiments, the bottom surface 112 may have a larger perimeter or circumference than the perimeter or circumference of the shelf 120 of the receptacle 116.

The overall height, H, of the sign apparatus 100 may be between 4 foot and 8 foot or within a range of 3 feet to 10 feet when measured as a vertical distance from the bottom surface 112 of the base 110 to an uppermost edge of the panel 102. The receptacle 116 may be positioned near the top of the base 110 such that the shelf 120 of the receptacle 116 may be located at a height, H1, which is at least two-thirds of the overall height, H2, of the base 110.

The sign apparatus 100 may require a necessary amount of weight in order for it to resist wind and other forces from knocking over or moving the sign. In the embodiments disclosed herein, this necessary weight is comprised from both the ballast material 142 and plant material, where the plant material is comprised of both the plant or plants 150 (and/or others) and the soil 152 (and/or other growth medium material(s)) required to sustain them, plus any other decorative elements, if present. In some instances, the combined weight of the ballast material 142 and the plant material may comprise at least or greater than 50 percent of the total weight of the sign apparatus 100, or at least 60 percent of the total weight of the sign apparatus 100, or at least 80 percent of the total weight of the sign apparatus 100. As described further below, the plant material may comprise a majority of the total weight of the sign apparatus 100

Figure 2:
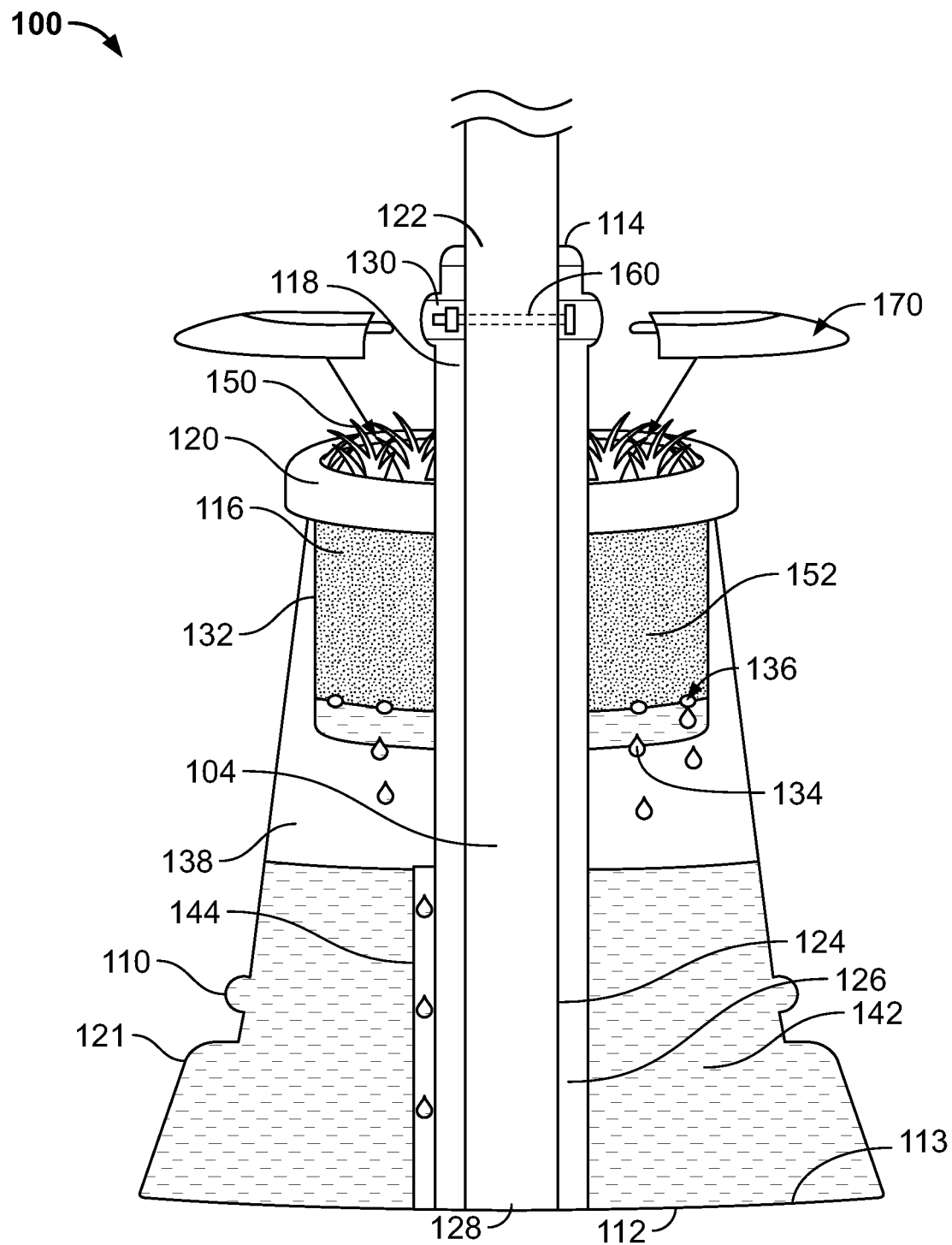
FIG. 2 illustrates a cut-away view of the example embodiment of the sign apparatus of FIG. 1 as disclosed herein.

As shown in the cutaway view shown in FIG. 2, the receiver element 118 may include an opening 122 extending through the upper surface 114. The opening 122 may extend into an interior chamber 124 within the receiver element 118 that receives and secures the support post 104 to the base 110. A supporting wall 126 may define the exterior of the receiver element 118 and be positioned around the interior chamber 124 that extends from the bottom surface 112 to the upper surface 114. The bottom surface 112 may act as a lower wall for the interior chamber 124, or in other embodiments, the interior chamber 124 may have an aperture 128 extending through the bottom surface 112, causing the opening 122 to extend through both the upper surface 114 and the bottom surface 112. While the exemplary embodiment illustrates the receiver element 118 being centrally located in the base 110, the receiver element 118 may be biased to one side of the base 110.

In addition, the receiver element 118 may include an aperture 130 extending in a transverse or perpendicular direction through the supporting wall 126. The aperture 130 may allow a securing device 160 to extend through the aperture 130 and a corresponding aperture within the support post 104 to secure the support post 104 to the base 110 by preventing any rotation or vertical movement of the support post 104 relative to the base 110. In order to remove the support post 104 from the base 110, the securing device 160 must be first removed. The securing device 160 may be a mechanical device such as a pin with a detente type system, a bolt secured with a nut, or other similar components.

As discussed above, the base 110 may have a receptacle or planter portion 116. In some embodiments, the base 110 may be partially hollow and configured to enclose one or more other components of the apparatus 100. The receptacle 116 may have a sidewall 132 that extend downward from the upper shelf 120 and a bottom wall 134 that acts as foundation for the planter portion 116. In some embodiments, the shelf 120 of the receptacle 116 may be the only exposed exterior surface of the receptacle 116. The sidewall 132 and bottom wall 134 may form a container to hold the plants 150 and their corresponding soil 152 needed to sustain them (and/or other similar decorative elements/growth mediums, or filling mediums). The receiver element 118 may extend through the bottom wall 134 of the receptacle 116. Additionally, the planter portion 116 may have at least one opening or optionally a plurality of openings 136. These openings 136 may be located in the sidewall 132 as illustrated in FIG. 2 or alternatively, the openings 136 may be present in the bottom wall 134. As another option, these openings 136 may be present in both the sidewall 132 and the bottom wall 134. The openings 136 may allow any excess water to drain out of the planter portion 116 and into the ballast area 138 located below the bottom wall 134 of the base 110. Thus, in some examples, the ballast area 138 is refilled continually due to typical maintenance of the plant material (e.g. watering) or rainfall. In some embodiments, the planter portion 116 may be removably connected to the base 110. Alternatively, the planter portion 116 may be permanently attached or integrally formed with the base 110 in some embodiments.

Figure 3:
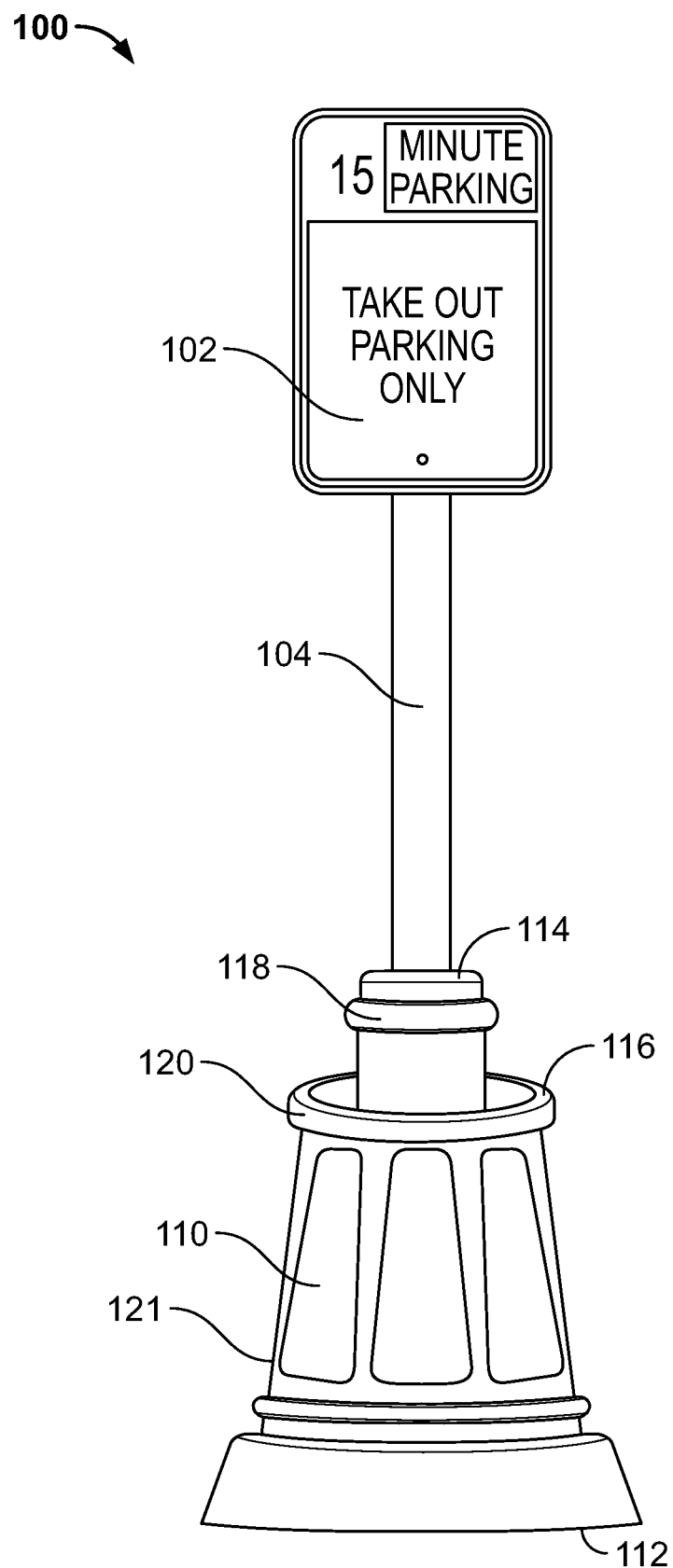
FIG. 3 illustrates a front view of the example embodiment of the sign apparatus of FIG. 1 as disclosed herein with a portion removed for clarity.
Figure 4:
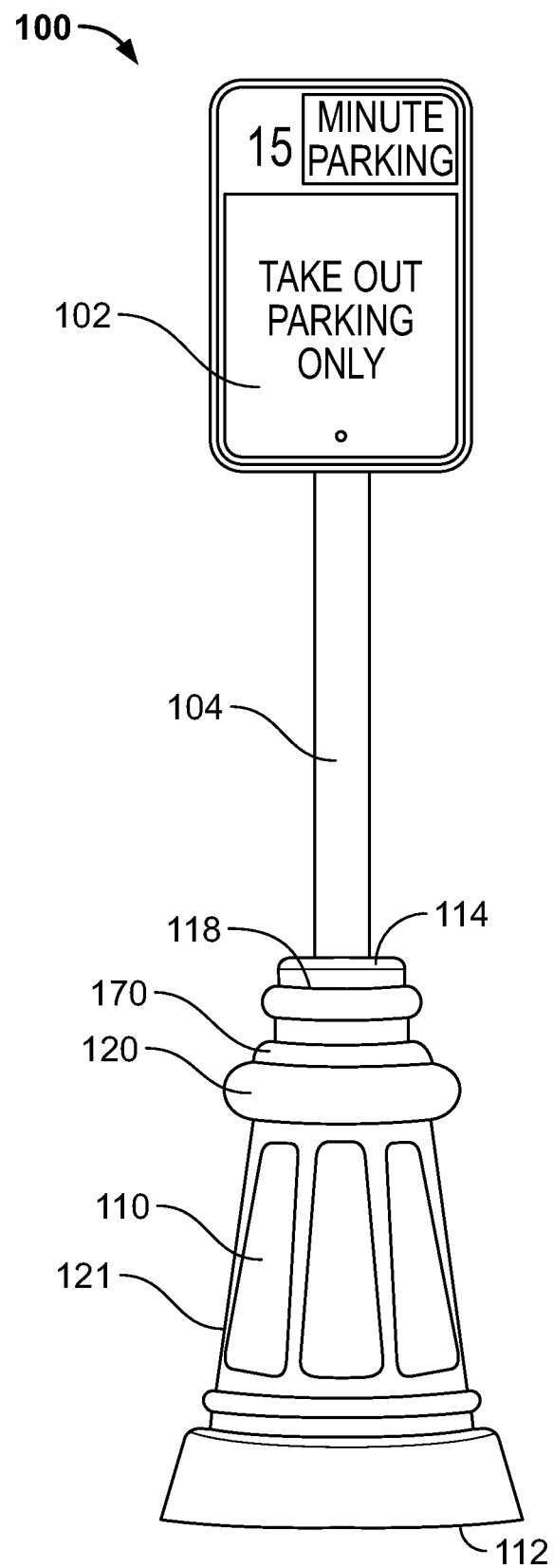
FIG. 4 illustrates a front view of the example embodiment of the sign apparatus of FIG. 1 as disclosed herein with a cover installed.
Figure 5:
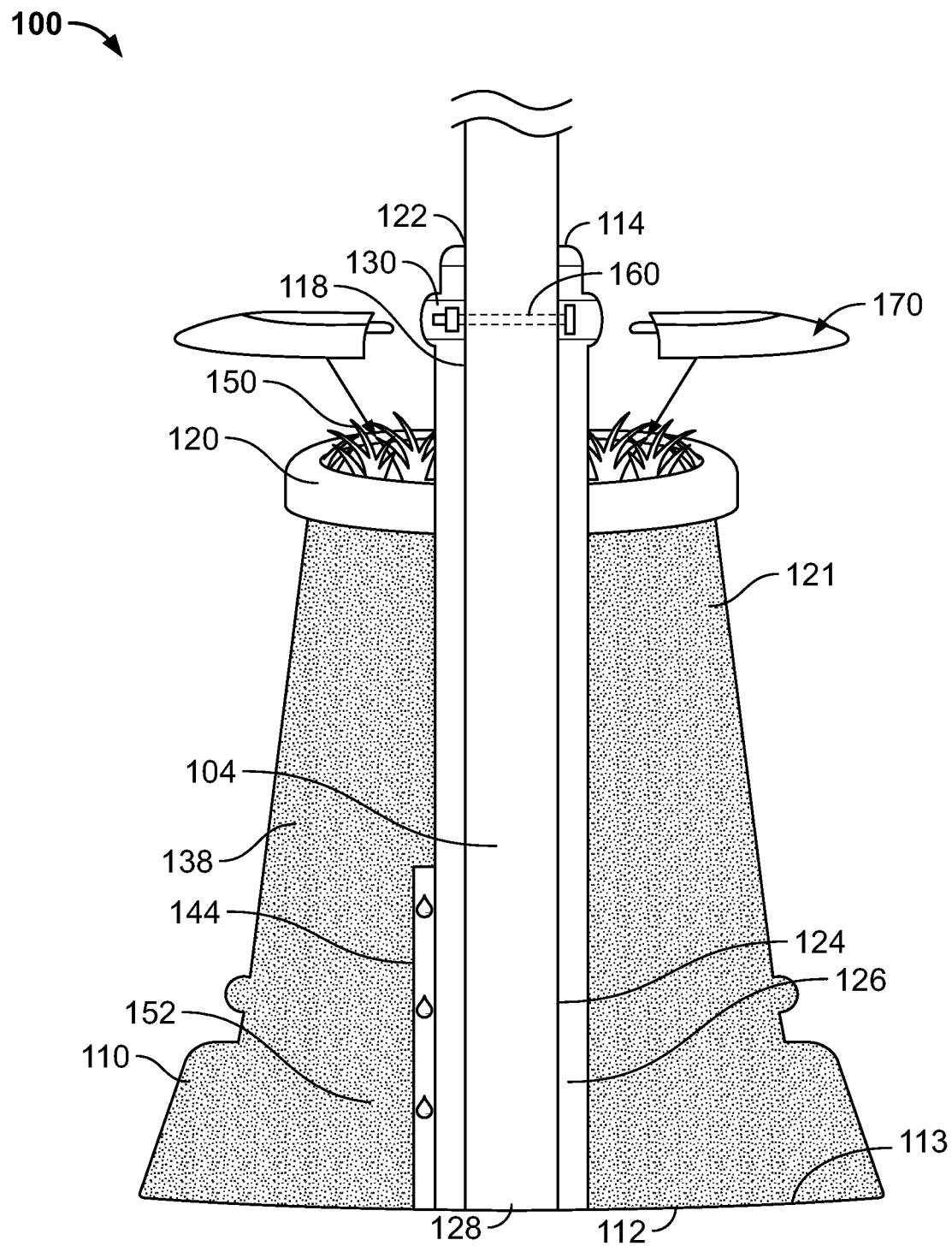
FIG. 5 illustrates a cut-away view of an alternate example embodiment of the sign apparatus of FIG. 1 as disclosed herein.

In some embodiments, the sign apparatus 100 may further comprise a cover 170 as shown in FIGS. 2, 4, and 5. The cover 170 may have a curved or domed shape that fits over opening of the receptacle or planter portion 116 to give a smooth appearance to top of the base 110 of the sign apparatus 100 when the plants 150 are removed. For instance, during the winter or non-growing season, the plants 150 may be removed as shown in FIG. 3. In addition, the cover 170 may be installed for transporting the sign apparatus 100 to hold any soil or other material within the receptacle 116. The cover 170 may be removably connected to the base 110 and extend from the top of the shelf 120 to the receiver 118. In some embodiments, the cover may 170 include two components each configured to cover half of the top of the receptacle and to fit around the receiver element 118. The components of the cover 170 may releasably attach together, such as with a snap fit connection, mechanical fasteners, or other similar method. The cover 170 may further releasably attach to the receptacle 116. For example, the cover 170 may be attached to the receptacle 116 with a snap fit connection, mechanical fasteners or other similar method. In other embodiments, the cover 170 may be formed from a single component or in some embodiment, the cover 170 may be formed from more than two components, such as three or four components.

When plants or flowers comprise the display elements, the plants or flowers 150 may comprise any type of living plants that may grow. The plants may be low maintenance type plants such as cacti or succulents. As an alternative, the display elements 150 may not be living plants, but may be cosmetic plants or flowers made of a polymer or other inorganic material.

As discussed above, the ballast area 138 of the base 110 may contain a portion of the weight necessary to provide the weight necessary for the sign apparatus 100 to resist any movement caused by wind or other forces. The ballast area 138 may comprise the hollow interior lower portion of the base 110 defined by the interior surface of the outer wall 121 and the interior surface 113 opposite the bottom surface 112. The receiver element 118 may also extend through the ballast area 138 such that the ballast area 138 surrounds the supporting wall 126 of the receiver element 118. The ballast area 138 may contain a ballast material 142 to add mass to the base 110.

In certain embodiments, the base 110 may also comprise an access mechanism to allow a user to fill the ballast area 138 with one or more ballast materials. In one example, a user may access the ballast area 138 through an access panel or door on the base 110. The user may be able to open the access panel or door located below the bottom wall 134 of the planter portion 116, then pour the ballast material into the ballast area 138, and re-secure the access panel or door. As discussed above, the planter portion 116 may be removably connected to the base 110 to allow access to the ballast area 138. Alternatively, the planter portion 116 may be permanently attached or integrally formed with the base 110 in the embodiments having the access panel.

The ballast area 138 may further be configured to maintain a consistent level of ballast material 142 within the ballast area 138 or keep any excess fluid from building up within the ballast area 138. For example, the ballast area 138 may include a drain tube 144 that has a top surface at a predetermined height. The drain tube 144 may extend to an opening in either the bottom surface 112 or the outer wall 121 of the base 110 to allow any excess fluid within the ballast area 138 to drain out of the apparatus 100.

The ballast material 142 may comprise a liquid medium, a solid material, or both. In certain embodiments, the ballast material 142 is a liquid medium. In some embodiments, the liquid medium can consist or comprise water, saline, or other mixture. In other example embodiments, the ballast material 142 may be a solid material. The solid material may comprise sand, gravel, dirt, rocks, metal (e.g. lead) or another solid material. In yet other examples, the ballast material 142 may comprise both solid and liquid components, including embodiments where the ballast material 142 is a slurry.

As described above, in certain embodiments, the base 110 may include an access panel to provide access to the ballast area 138. Access to the ballast area 138 may provide the user simplified filling and emptying of the ballast material 142 from the ballast area 138, for example filling the ballast area 138 when the sign apparatus 100 is in a position to be visually displayed and removing the ballast material 142 when the sign apparatus 100 is desired to be transported to another location or taken down. Removal of the ballast material 142 increases the mobility of the sign apparatus 100 when it is to be moved or relocated. This can further enhance the portability of the sign apparatus 100.

In an alternate embodiment of the sign apparatus 100 as shown in FIG. 5, the base 110 may comprise a hollow portion that is open from the shelf 120 positioned at the height, H1. The hollow portion acts as the ballast area 138, where the ballast area 138 is filled entirely from the interior surface 113 of the bottom surface 112 to the shelf 120 with soil 152 to support the plant material 150 along with the soil necessary to sustain it.

The base 110 may consist of or comprise any suitable material that is capable of sufficiently supporting the other components of the apparatus. In some embodiments, the base 110 may comprise one or more of wood, polymer, plastic, ceramic, or a metal and/or a metallic alloy, including but not limited to steel and/or aluminum. The base 110 may be formed by a molding process or casting process.

The base 110 may be a variety of shapes and sizes depending on the desired terrain or surface the sign is to be placed on and/or the size and type of the panel 102 itself. For example, in certain embodiments the base 110 may have a substantially conical shape or cylindrical shape, but also may be generally rectangular or other geometric shape. In various examples, the bottom surface 112 of the base 110 may be a flat bottom surface 112 such that it will be flush or substantially flush to a surface, such as the ground, that it is placed.

As described above, the support post 104 may directly or indirectly secure the panel 102 to the sign apparatus 100. The panel 102 may be any visual materials that include textual and or graphical information and in some examples, the visual materials may be an advertisement. In some examples, the support post 104 may consist of or comprise polymer, ceramic, wood, or a metal and/or a metallic alloy, including but not limited to steel and/or aluminum. In certain examples, at least a portion of the support post 104 defines a longitudinal or vertical axis. In some examples, the support post 104 comprises an elongated member or an elongated portion along the longitudinal axis. In certain examples, the elongated portion may be cylindrical, while in other examples, the elongated portion may comprise one or more flat surfaces. The cross-section of the receiver element 118 may have a substantially similar cross-section to the elongated portion of the support post 104.

The support post 104 may comprise one or more securing components configured to secure another object, such as the panel 102. In some embodiments, the securing components comprise one or more screws, rivets, nails, clamps, clips, apertures, extension arms, fingers, or protrusions, tabs, detents, threads, or resilient materials. In various examples, the one or more securing components are configured to interact with a corresponding component on an object, such as the panel 102 (e.g. corresponding threads, a corresponding cavity to receive screw, or corresponding tab and detent structures) while in others the one or more securing components are configured to interact with an edge or a portion of an object/panel (e.g. a channel or aperture designed to accept the entire bottom edge of a panel (such that the actual bottom edge is not visible when the panel is attached), or one or more extensions designed to extend into the interior of a panel). In some examples, apertures or indentations are configured to receive a portion of a connector component that is attached to the object/panel.

The panel 102 may be permanently or removably secured to the support post 104. In some examples, the panel 102 and the support post 104 may be a single unitary component, while in other embodiments these components are designed to be directly and or operably connected to each other when assembled, for example (but not limited to) by an end user.

The panel 102 may be any suitable material for displaying information, including textual and/or graphic and/or advertising information, or other visual material. In some examples, the panel 102 may consist of or comprise plywood, metal, plastic, corrugated plastic, steel, carbon-fiber composite, aluminum, one or more writing surfaces such as a chalk-board or white-board, one or more LED panels, one or more video or television screens, or one or more surfaces designed to receive a projection from a projector. In certain examples, some or all of the panel 102 may comprise a weather and/or water and/or sun resistant material, such that it may efficiently convey visual information even after prolonged, accumulated exposure to the elements.

The panel 102 may be any suitable size and shape depending on the needs of the user and/or the information or visual material being displayed. In certain examples, the panel may have a variety of geometric shapes and/or sizes, for example a rectangle, a square, a trapezoid, or other geometric shapes. In some examples, the panel 102 may have an irregular, non-symmetrical or non-geometric shape, or a shape comprising a combination of one or more other shapes (e.g. multiple geometric shapes). In certain other examples, the panel 102 has a first height at bottom of the panel and a second height at the top of the panel. In some embodiments, as shown in FIGS. 1, 3, and 4, the panel 102 may be primarily rectangular in shape.

The panel 102 may have any dimensions that are appropriate for displaying visual material, for example an advertisement. In certain examples, the panel 102 may have a width of approximately 12 inches, or within a range of 12 inches to 24 inches, or within a range of 8 inches to 24 inches. In addition, the panel 102 may have a height of approximately 18 inches, or within a range of 16 inches to 20 inches, or within a range of 6 inches to 36 inches. In various embodiments, the panel 102 may have a first height defined by the vertical distance from the bottom edge or bottom-most surface/portion of the panel (for example, if the panel has a non-geometric shape) to the top edge of top-most surface/portion of the panel (for example, a point of a pyramidal shaped panel, or the top portion of a radius when the upper portion of the panel is curved). In some examples, the panel 102 may have a width defined by the horizontal distance from its side edges, or the horizontal distance from the outward most extending surfaces of the side of the panel 102. Non-panel objects held by the apparatus may have similar dimensions and/or heights/widths and/or shapes. In some examples, the panel 102 may be approximately 0.08 inches thick, or within a range of 0.06 inches to 0.125 inches thick, or even greater than 0.125 inches. In certain embodiments, the panel 102 may have a variable thickness. In some embodiments, the panel 102 may have a weight of approximately 2 pounds, or within a range of 1 pound to 5 pounds.

These descriptions of the various sign apparatuses 100 are merely examples. Embodiments of the apparatus may comprise any of the features described above in reference to the example embodiments of the apparatus. In certain embodiments, the apparatus comprises additional combinations or substitutions of some or all of the components described above. Moreover, additional and alternative suitable variations, forms and components for the apparatus will be recognized by those skilled in the art given the benefit of this disclosure.

The present disclosure is disclosed above and in the accompanying drawings with reference to a variety of examples and embodiments. The purpose served by the disclosure, however, is to provide examples of the various features and concepts related to the disclosure, not to limit the scope of the disclosure. One skilled in the relevant art will recognize that numerous variations and modifications may be made to the aspects described above without departing from the scope of the present invention, as defined by the appended claims. The claims are not to be limited to details of the preferred embodiment except as stated to exist in the claims, and definitions of claim terms are not to be used as a subterfuge to limit the claims to details of the preferred embodiments by defining claim terms narrowly such that they incorporate details of the preferred embodiment.

What is claimed is:

1. A sign apparatus comprising:
a base having a bottom surface, an upper surface opposite the bottom surface, a receiver that is centrally located on the base, wherein the receiver extends from the upper surface to the bottom surface, a receptacle spaced below the upper surface, a ballast area defined by a hollow lower interior portion of the base positioned below the receptacle, wherein the receptacle is configured to contain living plant material;
wherein the receiver has an opening that is configured to receive a support post;
wherein the receptacle includes a shelf spaced away from and below the upper surface of the base, a sidewall, and a bottom wall that form a container configured to hold the living plant material; and
a cover removably connected to the base, wherein the cover extends from a top surface of the shelf to the receiver.

2. The sign apparatus of claim 1, further comprising a support post received within the receiver; and a panel displaying visual information attached to the support post.

3. The sign apparatus of claim 2, wherein the sign apparatus has an overall height defined as a vertical distance from the bottom surface of the base to an uppermost edge of the panel, wherein the overall height is between 4 feet and 8 feet.

4. The sign apparatus of claim 1, wherein the bottom surface of the base has a larger perimeter than a perimeter of the shelf.

5. The sign apparatus of claim 1, wherein the cover has a convexly curved upper surface.

6. The sign apparatus of claim 1, wherein the receptacle has at least one opening that allows water to drain from the receptacle into the ballast area.

7. The sign apparatus of claim 1, wherein the receptacle is integrally formed with the base.

8. The sign apparatus of claim 1, wherein the ballast area contains a ballast material comprising both solid and liquid components.

9. A sign apparatus comprising:
a base having a bottom surface, an upper surface opposite the bottom surface, a receiver, wherein the receiver extends through the upper surface and the bottom surface, a receptacle, and a ballast area positioned below the receptacle, wherein the receptacle includes a shelf spaced away from and below the upper surface, a sidewall, and a bottom wall that form a container configured to hold display elements;
a support post received within an opening of the receiver; and
a panel displaying visual information attached to the support post,
wherein the sign apparatus has an overall height defined as a vertical distance from the bottom surface of the base to an uppermost edge of the panel, wherein the overall height is between 4 feet and 8 feet.

10. The sign apparatus of claim 9, wherein the ballast area contains ballast material such that a combined weight of the ballast material and the display elements comprise at least 50 percent of a total weight of the sign apparatus.

11. The sign apparatus of claim 9, wherein the base has an outer wall extending between the shelf of the receptacle and the bottom surface.

12. The sign apparatus of claim 11, wherein the ballast area has a drain tube that connects to an opening in the outer wall of the base.

13. The sign apparatus of claim 9, further comprising a cover removably connected to the base, wherein the cover extends from a top surface of the shelf to the receiver.

14. The sign apparatus of claim 9, wherein a height of the shelf of the receptacle defined as a vertical distance from the bottom surface to a top surface of the shelf is at least two-thirds of a height of the base, wherein the height of the base is defined as a vertical distance from the bottom surface to the upper surface of the base.

15. The sign apparatus of claim 9, wherein the base includes an access panel to access the ballast area.

16. The sign apparatus of claim 9, wherein the panel has a vertical height within a range of 16 inches and 20 inches.

* * * * *